United States Patent [19]

Jaggard et al.

[11] 4,385,160

[45] May 24, 1983

[54] PREPARATION OF HOMOPOLYMERS AND COPOLYMERS OF α-MONOOLEFINS BY MEANS OF A ZIEGLER-NATTA CATALYST SYSTEM

[75] Inventors: James F. R. Jaggard, Ludwigshafen; Peter Klaerner, Battenberg; Guenther Schweier, Friedelsheim, all of Fed. Rep. of Germany

[73] Assignee: BASF Aktiengesellschaft, Fed. Rep. of Germany

[21] Appl. No.: 267,923

[22] Filed: May 28, 1981

[30] Foreign Application Priority Data

Jun. 2, 1980 [DE] Fed. Rep. of Germany ....... 3020827

[51] Int. Cl.$^3$ .......................... C08F 4/64; C08F 10/00
[52] U.S. Cl. ................................ 526/139; 252/429 B; 526/351; 526/906
[58] Field of Search ................................ 526/139, 142

[56] References Cited

U.S. PATENT DOCUMENTS

| | | | |
|---|---|---|---|
| 3,701,763 | 10/1972 | Wada et al. | 526/142 |
| 3,977,997 | 8/1976 | Schick et al. | 526/139 |
| 4,260,710 | 4/1981 | Staiger et al. | 526/142 |

*Primary Examiner*—Edward J. Smith
*Attorney, Agent, or Firm*—Keil & Witherspoon

[57] ABSTRACT

Alpha-olefins are polymerized with a catalyst containing (1) $TiCl_3/AlCl_3$ and (2) aluminum dialkyl chloride wherein (1) is prepared by milling the $TiCl_3/AlCl_3$ with a particular phosphorous compound under special conditions and then treating with a liquid hydrocarbon and an ether and/or ester.

4 Claims, No Drawings

PREPARATION OF HOMOPOLYMERS AND COPOLYMERS OF α-MONOOLEFINS BY MEANS OF A ZIEGLER-NATTA CATALYST SYSTEM

The present invention relates to a process for the preparation of homopolymers and copolymers of $C_2$-$C_6$-α-monoolefins at from 20° to 160° C., especially from 50° to 120° C., and under a pressure of from 1 to 100, especially from 20 to 70, bar, by means of a Ziegler-Natta catalyst system comprising (1) a titanium-III component, in the preparation of which (1.1) a titanium-containing compound (a) of the formula $$TiCl_3 \cdot nAlCl_3$$

where n is a number from 0.01 to 1, especially from 0.1 to 0.4, and (1.2) a phosphorus-containing compound (b) of the formula $$O_m PR_3^1$$

where m is 0 or 1, $R^1$ is $R^2$, $OR^2$ or $NR_2^2$ and $R^2$ is alkyl, aryl, alkaryl or aralkyl, of not more than 24, especially not more than 8, carbon atoms, are subjected to a milling treatment wherein (A) a vibratory ball mill which has a milling acceleration of from 30 to 80, especially from 45 to 55, m.sec$^{-2}$ is employed, (B) the mill is first charged with the titanium-containing compound (a) and—if desired—is run at from $-50°$ to $+100°$ C., especially from $-30°$ to $+50°$ C., for a period of from 0.5 to 100, especially from 2 to 20, hours, in the absence of a diluent, then (C) whilst milling the charge at from $-50°$ to $+80°$ C., especially from $-30°$ to $+60°$ C., the amount of the phosphorus-containing compound (b) which corresponds to a molar ratio of titanium in the titanium-containing compound (a): phosphorus-containing compound (b) of from 1:0.01 to 1:1, especially from 1:0.1 to 1:0.35, is added continuously or in small portions at a rate of from 0.01 to 200, especially from 1 to 80, ml/min per 2.5 kg of titanium-containing compound (a), in the absence of a diluent, thereupon (D) the charge is kept at from $+15°$ to $+120°$ C., especially from $+30°$ to $+90°$ C., for a period of from 1 to 100, especially from 5 to 30, hours whilst being milled, hereupon (E)—if desired—the product obtained from (D) is milled further for a period of from 0.5 to 60, especially from 2 to 30, minutes, at from $-50°$ to $+5°$ C., especially from $-40°$ to $0°$ C., in the absence of a diluent, then (F)—if desired, and advantageously—the product obtained from (D) or (E) is kept at from $+20°$ to $+150°$ C., especially from $+45°$ to $+100°$ C., for a period of from 0.25 to 300 hours, especially from 2 to 150 hours, without being milled, and thereafter (G)—if desired—the product obtained according to (F) is milled further for a period of from 0.5 to 60, especially from 2 to 30, minutes at from $-50°$ to $+5°$ C., especially from $-40°$ to $0°$ C., in the absence of a diluent, (2) an aluminum-alkyl component of the formula

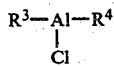

where $R^3$ and $R^4$ are identical or different and each is alkyl of 1 to 8, especially of 2 to 4, carbon atoms, and (3)—if desired—a phenolic compound of the formula

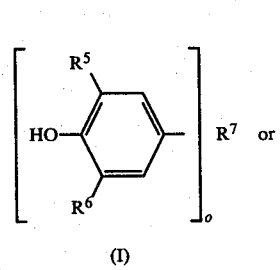

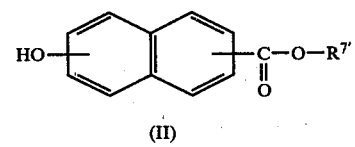

where $R^5$ is $C_1$-$C_6$-alkyl, especially $C_3$-$C_4$-alkyl, $R^6$ is hydrogen or $C_1$-$C_6$-alkyl, especially $C_3$-$C_4$-alkyl, $R^7$ is hydrogen or a saturated hydrocarbon radical of not more than 30, especially not more than 24, carbon atoms, which may or may not contain up to a total of 6, especially up to a total of 4, ether groups and/or ester groups, $R^{7'}$ is $C_2$-$C_{24}$-alkyl, especially $C_4$-$C_{18}$-alkyl and o is an integer from 1 to 6, especially from 1 to 4, with the proviso that the atomic ratio of titanium from the titanium-III component (1): aluminum from the aluminum-alkyl component (2) is from 1:1 to 1:20, especially from 1:2 to 1:15 and that, where relevant, the molar ratio of aluminum-alkyl component (2): phenolic compound (3) is from 1:1 to 40:1, especially from 3:1 to 25:1.

Processes of this type are known; what distinguishes them from other comparable processes is the specific form of the catalyst system, examples of prototypes for the process of the present invention being the processes disclosed in German Laid-Open Application DOS No. 2,400,190 (=U.S. Pat. No. 3,977,997) and German Laid-Open Application DOS No. 2,841,645.

The specific embodiments of the catalyst system are aimed at achieving particular objectives, for example the following:

(a) Catalyst systems which, in the polymerization of α-monoolefins, especially propylene, give polymers having a high proportion of stereoregular (=isotactic) material.

(b) Catalyst systems which can give an increased yield of polymer, namely systems which have a higher productivity, ie. systems in which the amount of polymer formed per unit weight of the catalyst system is increased.

(c) Catalyst systems by means of which less halogen is introduced into the polymer, this being achievable by increasing the yield as in (b) and/or by employing a titanium halide which contains very little halogen.

(d) Catalyst systems whose activity maximum remains constant or relatively constant for a very long time, this being of considerable importance in respect of the catalyst yields.

(e) Catalyst systems with which it is possible, by increasing the polymerization temperature, to achieve an increase in conversion without a significant reduction in the stereoregularity of the polymers, such increase being a generally desirable effect, especially in dry phase polymerization.

(f) Catalyst systems by means of which—especially at relatively high polymerization temperatures—the morphological properties of the polymers are influenced in a certain way, for example in the sense of giving a uniform particle size and/or reducing the proportion of fines and/or giving a high bulk density; this can be of importance in respect of, for example, the technical control of the polymerization systems, the working up of the polymers and/or the processability of the polymers.

(g) Catalyst systems which are simple and safe to prepare and easy to handle, for example systems which can be prepared in (inert) hydrocarbon auxiliary media.

(h) Catalyst systems which make it possible, where the polymerization is carried out using a molecular weight regulator, in particular hydrogen, to manage with relatively small amounts of regulator; this can, for example, be important with respect to the thermodynamics of the process.

(i) Catalyst systems which are tailored to specific polymerization processes, for example those intended to suit either the specific peculiarities of suspension polymerization or the specific peculiarities of dry phase polymerization.

(j) Catalyst systems which lead to polymers whose spectrum of properties makes them particularly suitable for one or other field of use.

According to experience gathered hitherto, there are, amongst the numerous objectives, some which can only be achieved by special embodiments of the catalyst system at the expense of other objectives.

Under these circumstances, the endeavor is generally to find embodiments with which not only the particular objectives are achieved, but other desirable objectives need be sacrificed as little as possible.

This is the object of the present invention, namely to provide a novel embodiment of a catalyst system, with which, compared to conventional embodiments, it is possible to obtain, at relatively higher temperatures, and with correspondingly relatively high polymer yields, polymers which have a relatively higher stereoregularity (=isotacticity) and in particular also have advantageous morphological properties, such as a low proportion of fines.

We have found that this object is achieved by a catalyst system of the initially defined type, wherein the titanium-III component (1) is subjected to an additional specific chemical treatment after the milling treatment.

Accordingly, the present invention relates to a process for the preparation of homopolymers and copolymers of $C_2$–$C_6$-α-monoolefins at from 20° to 160° C., especially from 50° to 120° C., and under a pressure of from 1 to 100, especially from 20 to 70, bar, by means of a Ziegler-Natta catalyst system comprising (1) a titanium-III component, in the preparation of which (1.1) a titanium-containing compound (a) of the formula $$TiCl_3 \cdot nAlCl_3$$

where n is a number from 0.01 to 1, especially from 0.1 to 0.4, and (1.2) a phosphorus-containing compound (b) of the formula $$O_m PR_3^1$$

where m is 0 or 1, $R^1$ is $R^2$, $OR^2$ or $NR_2^2$ and $R^2$ is alkyl, aryl, alkaryl or aralkyl, of not more than 24, especially not more than 8, carbon atoms, are subjected to a milling treatment wherein (A) a vibratory ball mill which has a milling acceleration of from 30 to 80, especially from 45 to 55, m.sec$^{-2}$ is employed, (B) the mill is first charged with the titanium-containing compound (a) and—if desired—is run at from −50° to +100° C., especially from −30° to +50° C., for a period of from 0.5 to 100, especially from 2 to 20, hours, in the absence of a diluent, then (C) whilst milling the charge at from −50° to +80° C., especially from −30° to +60° C., the amount of the phosphorus-containing compound (b) which corresponds to a molar ratio of titanium in the titanium-containing compound (a): phosphorus-containing compound (b) of from 1:0.01 to 1:1, especially from 1:0.1 to 1:0.35, is added continuously or in small portions at a rate of from 0.01 to 200, especially from 1 to 80, ml/min per 2.5 kg of titanium-containing compound (a), in the absence of a diluent, thereupon (D) the charge is kept at from +15° to +120° C., especially from +30° to +90° C., for a period of from 1 to 100, especially from 5 to 30, hours, whilst being milled, hereupon (E)—if desired—the product obtained from (D) is milled further for a period of from 0.5 to 60, especially from 2 to 30, minutes, at from −50° to +5° C., especially from −40° to 0° C., in the absence of a diluent, then (F)—if desired, and advantageously—the product obtained from (D) or (E) is kept at from +20° to +150° C., especially from +45° to +100° C., for a period of from 0.25 to 300 hours, especially from 2 to 150 hours, without being milled, and thereafter (G)—if desired—the product obtained according to (F) is milled further for a period of from 0.5 to 60, especially from 2 to 30, minutes at from −50° to +5° C., especially from −40° to 0° C., in the absence of a diluent, (2) an aluminum-alkyl component of the formula

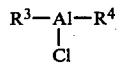

where $R^3$ and $R^4$ are identical or different and each is alkyl of 1 to 8, especially of 2 to 4, carbon atoms, and (3)—if desired—a phenolic compound of the formula

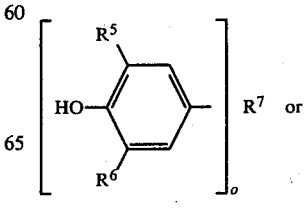

(I)

-continued

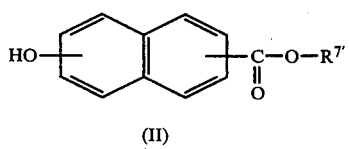

(II)

where $R^5$ is $C_1$–$C_6$-alkyl, especially $C_3$–$C_4$-alkyl, $R^6$ is hydrogen or $C_1$–$C_6$-alkyl, especially $C_3$–$C_4$-alkyl, $R^7$ is hydrogen or a saturated hydrocarbon radical of not more than 30, especially not more than 24, carbon atoms, which may or may not contain up to a total of 6, especially up to a total of 4, ether groups and/or ester groups, $R^{7'}$ is $C_2$–$C_{24}$-alkyl, especially $C_4$–$C_{18}$-alkyl and o is an integer from 1 to 6, especially from 1 to 4, with the proviso that the atomic ratio of titanium from the titanium-III component (1): aluminum from the aluminum-alkyl component (2) is from 1:1 to 1:20, especially from 1:2 to 1:15 and that, where relevant, the molar ratio of aluminum-alkyl component (2): phenolic compound (3) is from 1:1 to 40:1, especially from 3:1 to 25:1, in which process a titanium-III component (1) is employed, in the preparation of which, additionally, (H) a suspension is prepared from (H$_1$) 1 part by weight of the product obtained from (D), (E), (F) or (G), (H$_2$) from 0.5 to 20, especially from 0.7 to 2, parts by weight of a hydrocarbon (c) which is liquid at standard temperature and pressure and boils below 150° C., especially below 100° C., and (H$_3$) an oxygen-containing compound (d) consisting of (d$_1$) an ether which has a total of 4 to 30, especially of 6 to 16, carbon atoms, and has the formula

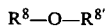

where $R^8$ and $R^{8'}$ are identical or different and are (I) alkyl of 1 to 15, especially of 3 to 8, carbon atoms, (II) phenyl or (III) alkylphenyl of a total of 7 to 14, especially 7 to 10, carbon atoms and/or (d$_2$)—preferably—an ester which has a total of 2 to 34, especially 2 to 14, carbon atoms and has the formula $R^{9'}$—O—CO—$R^9$   or

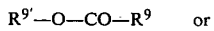

where $R^9$ is (I) hydrogen, (II) alkyl of 1 to 12, especially of 1 to 9, carbon atoms, (III) phenylalkyl of a total of 7 to 14, especially 7 to 10, carbon atoms, in which 1 hydrogen atom of the phenyl radical can be replaced by alkyl, (IV) phenyl or (V) alkylphenyl of a total of 7 to 14, especially 7 to 10, carbon atoms, and $R^{9'}$ is (I) alkyl of 1 to 8, especially of 1 to 4, carbon atoms, (II) phenyl or (III) phenylalkyl of a total of 7 to 14, especially 7 to 10, carbon atoms, in such amount that the molar ratio of titanium from the titanium-containing compound (a): oxygen-containing compound (d) is from 1:0.01 to 1:2, especially from 1:0.08 to 1:0.5, thereafter (I) the suspension obtained from (H) is kept at from +40° to +140° C., especially from +50° to +95° C., for from 5 to 120, especially from 15 to 60, minutes, with vigorous agitation, and is then brought to from +15° to +25° C., and hereupon (J)—if desired—the solid is isolated from the suspension obtained according to (I), if desired, washed with a hydrocarbon which is liquid at standard temperature and pressure and boils below 150° C., especially below 100° C., and dried, the solid thus obtained in suspended form from (I) or in isolated form from (J) constituting the novel titanium-III component (1).

The following details may be noted in respect of the process according to the invention.

The polymerization process as such can, taking due account of the characterizing feature, be carried out in virtually all relevant conventional technological embodiments, such as a batchwise, cyclic or continuous process, for example as a suspension polymerization process or dry phase polymerization process. The technological embodiments mentioned, ie. the technological variants of the Ziegler-Natta polymerization of α-monoolefins, are well known from the literature and from industrial practice and more detailed comments are therefore superfluous.

For completeness it should be mentioned that in the process according to the invention the molecular weights of the polymers can be regulated by the relevant conventional measures, for example by means of a regulator, especially hydrogen.

Further, it is to be noted that in the process according to the invention the components of the catalyst system can be introduced into the polymerization in a variety of ways, for example (i) the titanium component (1), the aluminum-alkyl component (2) and, where relevant, the phenolic compound (3) all at the same point, (ii) the same components all at separate points, (iii) component (1) at one point and a mixture of components (2) and (3) at another point—which can be of advantage especially in a dry phase polymerization process—, or(iv) a mixture of components (1) and (3) at one point and component (2) at another point.

Finally, it is to be noted that the advantageous properties of the process according to the invention in general manifest themselves particularly if the process is carried out as a dry phase polymerization (typical examples of embodiments of such a process being given in German Published Applications DAS 1,217,071, DAS 1,520,307 and DAS 1,520,373).

As regards the materials employed in the novel catalyst system, the following details may be noted:

(1) The titanium-III component.

The titanium-containing compounds (a), having the stated formula, which serve as starting materials for this component are the relevant conventional compounds, for example those obtainable by co-crystallization of TiCl$_3$ and AlCl$_3$, or by reduction of TiCl$_4$ by means of aluminum or of a mixture of aluminum and titanium. Co-crystalline materials of the formula TiCl$_3$.⅓AlCl$_3$ are particularly suitable. The relevant titanium-containing compounds (a) are commercially available, so that further details are unnecessary.

Suitable phosphorus-containing compounds (b) having the stated formula are also the relevant conventional compounds of this formula, especially those where $R^1$ is $R^2$ or $NR_2^2$ and $R^2$ is $C_1$–$C_8$-alkyl, especially $C_1$–$C_4$-alkyl, or phenyl.

Examples of suitable compounds of this type are described in U.S. Pat. No. 3,186,977.

Specific examples of very suitable phosphorus-containing compounds are triphenylphosphine, triphenylphosphine oxide, tri-n-butylphosphine, tri-n-butylphosphine oxide and hexamethylphosphorotriamide. Amongst these, triphenylphosphine oxide and tri-n-butylphosphine are especially preferred.

The liquid hydrocarbon (c), also employed, can be a hydrocarbon of the type which is conventionally brought together with titanium-containing components of Ziegler-Natta catalysts, without detriment to the catalyst or to its titanium-containing component, for example in the polymerization of α-monoolefins. Examples of suitable hydrocarbons are pentanes, hexanes, heptanes, gasolines and cyclohexane.

The oxygen-containing compound (d) also used in the preparation of the titanium-III component can be an ether ($d_1$) having the stated formula or, preferably, an ester ($d_2$) having the stated formula.

Suitable ethers ($d_1$) are the relevant conventional ethers conforming to the stated formula, especially those where $R^8$ and $R^{8'}$ are methyl, ethyl, propyl, butyl, amyl, hexyl, benzyl or phenyl. Suitable compounds of this type are described, for example, in U.S. Pat. No. 3,116,274.

Specific examples of very suitable ethers ($d_1$) are di-n-propyl ether, di-n-butyl ether, di-iso-butyl ether, di-iso-pentyl ether, di-n-amyl ether, di-n-hexyl ether and dibenzyl ether, of which di-n-butyl-ether is preferred.

Suitable esters ($d_2$) are the relevant conventional esters conforming to the stated formula, especially those where $R^9$ is hydrogen or methyl, ethyl, n-propyl, n-butyl, n-pentyl, i-pentyl, n-hexyl, n-heptyl, n-octyl, n-nonyl, n-decyl, n-undecyl, n-dodecyl, phenyl, benzyl, 1-phenylethyl, 2-phenylethyl, 3-phenylpropyl, 4-phenylbutyl or 5-phenylpentyl and $R^{9'}$ is methyl, ethyl, propyl, n-butyl, n-pentyl, i-pentyl, n-hexyl or benzyl.

Specific examples of very suitable esters ($d_2$) are ethyl caproate, ethyl pelargonate and ethyl laurate.

(2) The aluminum-alkyl component.

Suitable aluminum-alkyl components having the stated formula are the relevant conventional compounds of this formula; they are so well-known from the literature and from industrial practice that they do not require more detailed comment here. An exceptionally suitable example is diethyl-aluminum chloride.

(3) The phenolic compounds which are optionally used:

Typical examples of very suitable compounds of the above formula (I) are those where $R^5$ is tert.-butyl, $R^6$ is hydrogen or tert.-butyl, $R^7$ is hydrogen or lower alkyl, eg. methyl, ethyl, n-propyl, i-propyl, n-butyl, i-butyl or tert.-butyl, and $o=1$. Other important compounds are those where $R^5$ and $R^6$ have the meanings given above and $R^7$ has the formula

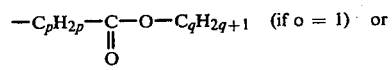 (if o = 1) or

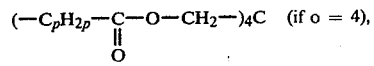 (if o = 4), where p is an integer from 0 to 5, especially from 1 to 4 and q is an integer from 1 to 24, especially from 1 to 18, and where the $-C_pH_{2p}-$ and $-C_qH_{2q+1}$ groups preferably have straight chains.

Specific examples of very suitable compounds of the above formula (I) are 1-hydroxy-2,6-di-tert.-butylbenzene, 4-hydroxy-3,5-di-tert.-butyltoluene, the ester of β-(4'-hydroxy-3',5'-di-tert.-butylphenyl)-propionic acid with methanol, ethanol, n-propanol, n-butanol, n-octanol, n-dodecanol or n-octadecanol, and the tetra-ester of the above acid with pentaerythritol, and also 1,3,5-trimethyl-2,4,6-tris-(3,5-di-tert.-butyl-4-hydroxybenzyl)-benzene.

Typical examples of very suitable compounds of the above formula (II) are those in which the acid moiety is derived from 2-hydroxy-4-naphthoic acid, 1-hydroxy-2-naphthoic acid, 2-hydroxy-1-naphthoic acid or 1-hydroxy-8-naphthoic acid and the alcohol moiety is derived from n-octanol, n-dodecanol or n-octadecanol.

Specific examples of very suitable compounds having the above formula (II) are n-octadecyl 2-hydroxy-4-naphthoate, n-dodecyl 1-hydroxy-8-naphthoate, n-octadecyl 1-hydroxy-8-naphthoate, n-octyl 1-hydroxy-2-naphthoate and n-octadecyl 2-hydroxy-1-naphthoate.

The preparation of the novel titanium-III component is simple and can be carried out by a skilled worker without detailed explanations. However, the following may be noted.

The measure described under (E) is advantageously carried out if a particularly narrow particle size distribution is desired.

The measure described under (F) in general has the effect that whilst the productivity of the catalyst system is slightly reduced, a polymer with distinctly coarse particles is obtained.

The measure described under (G) is desirable if stage (F) results in an agglomerated product.

In carrying out the measure according to (H), ie. preparing the corresponding suspension, it has been found that it is often advantageous first to bring the solid together with a relatively small amount of the hydrocarbon and then to add all the oxygen-containing compound, together with the remainder of the hydrocarbon.

In the course of carrying out the measure described under (I), the suspension should be agitated vigorously; this is most simply done by stirring.

The process according to the invention enables homopolymers and copolymers of $C_2$-$C_6$-α-monoolefins to be prepared in an advantageous manner, particularly suitable polymerizable α-monoolefins being propylene, but-1-ene and 4-methylpent-1-ene and, in the case of copolymerization, ethylene.

EXAMPLE 1

Preparation of the titanium-III component (1)

The procedure followed is to subject a titanium-containing compound (a) of the formula $TiCl_3.0.33\ AlCl_3$ and tri-n-butylphosphine as the phosphorus-containing compound (b) to a milling treatment wherein (A) a vibratory ball mill having a milling acceleration of 46 m.sec$^{-2}$ is used, (B) the mill is first charged with the titanium-containing compound (a) and then (C) whilst milling the charge at $-15°$ C., the amount of the phosphorus-containing compound (b) which corresponds to a molar ratio of titanium in the titanium-containing compound (a): phosphorus-containing compound (b) of 1:0.19 is added continuously at a rate of 1.5 ml/min per 2.5 kg of titanium-containing compound (a), in the absence of a diluent, thereupon (D) the charge is kept at $+70°$ C. for a period of 24 hours, whilst being milled, hereupon (E) the product obtained from (D) is milled further for a period of 20 minutes at −20° C. in the absence of a diluent and (F) the product obtained from (E) is kept at +70° C. for a period of 24 hours, without being milled.

(G) is omitted.

According to the invention, the procedure then followed is that additionally (H) a suspension is prepared from (H$_1$) 1 part by weight of the product obtained from (F), (H$_2$) 1.1 parts by weight of n-heptane as the hydrocarbon (c) and (H$_3$) di-n-butyl ether as the oxygen-containing compound (d), used in such amount that the molar ratio of titanium from the titanium-containing compound (a): oxygen-containing compound (d) is 1:0.13, thereafter (I) the suspension obtained from (H) is kept at +70° C. for a period of 30 minutes, with vigorous stirring, and is then brought to +25° C., and hereupon (J) the solid is isolated from the suspension obtained from (I), and is washed with n-heptane and dried, the isolated solid thus obtained from (J) constituting the titanium-III component (1).

Polymerization by means of the titanium-III component (1)

1.0 g of the titanium-III component (1) and 1.4 g of diethyl-aluminum chloride (2)-corresponding to an atomic ratio of titanium from the titanium-III component (1): aluminum from the diethyl-aluminum chloride (2) of about 1:3-are introduced into a 2 liter stirred flask which is charged with 1.5 liters of dry heptane. Polymerization is then carried out for a period of 5 hours, with stirring, at a propylene pressure of 1 bar and at 60° C., the pressure and temperature being kept constant by a regulating system, after which polymerization is stopped by adding 20 ml of methanol. The suspension medium is then removed by distillation.

Data on the polypropylene thus obtained are given in the Table below.

EXAMPLE 2

Preparation of the titanium-III component (1)

The procedure followed is to subject a titanium-containing compound (a) of the formula TiCl$_3$.0.33 AlCl$_3$ and tri-n-butylphosphine as the phosphorus-containing compound (b) to a milling treatment wherein (A) a vibratory ball mill having a milling acceleration of 48 m.sec$^{-2}$ is used, (B) the mill is first charged with the titanium-containing compound (a) and then (C) whilst milling the charge at −16° C., the amount of the phosphorus-containing compound (b) which corresponds to a molar ratio of titanium in the titanium-containing compound (a): phosphorus-containing compound (b) of 1:0.19 is added continuously at a rate of 1.5 ml/min per 2.5 kg of titanium-containing compound (a), in the absence of a diluent, thereupon (D) the charge is kept at +65° C. for a period of 30 hours, whilst being milled, hereupon (E) the product obtained from (D) is milled further for a period of 15 minutes at −25° C. in the absence of a diluent and (F) the product obtained from (E) is kept at +70° C. for a period of 26 hours, without being milled, and is then agitated a little to loosen it.

(G) is omitted.

According to the invention, the procedure then followed is that additionally (H) a suspension is prepared from (H$_1$) 1 part by weight of the product obtained from (F), (H$_2$) 1.0 part by weight of n-heptane as the hydrocarbon (c) and (H$_3$) ethyl caproate as the oxygen-containing compound (d), used in such amount that the molar ratio of titanium from the titanium-containing compound (a): oxygen-containing compound (d) is 1:0.14, thereafter (I) the suspension obtained from (H) is kept at +75° C. for a period of 30 minutes, with vigorous stirring, and is then brought to +20° C., and hereupon (J) the solid is isolated from the suspension obtained from (I), and is washed with n-heptane and dried, the isolated solid thus obtained from (J) constituting the titanium-III component (1).

Polymerization by means of the titanium-III component (1)

This is carried out as in Example 1, and the data on the polypropylene obtained are again shown in the Table below.

EXAMPLE 3

Preparation of the titanium-III component (1)

This is carried out in the same manner as in Example 2.

Polymerization by means of the titanium-III component (1)

This is carried out by a method similar to Example 1, using 1.0 g of the titanium-III component (1) and such an amount of diethyl-aluminum chloride (2) that the atomic ratio of titanium from the titanium-III component (1): aluminum from the diethyl-aluminum chloride (2) is 1:3, and such an amount of n-octadecyl β-(4'-hydroxy-3',5'-di-tert.-butylphenyl)-propionate (3) that the molar ratio of diethyl-aluminum chloride (2): phenolic compound (3) is 20:1.

The data of the polypropylene thus obtained are also shown in the Table.

In the Table:

Specific yield = parts by weight of polymer obtained per part by weight of titanium in the titanium-III component.

<xyz;% = percentage proportion of the polymer having a particle diameter of less than xyz μm.

./. = not determined

TABLE

| Example | Specific yield | <100; % | <250; % | <500; % |
|---------|----------------|---------|---------|---------|
| 1 | 675 | 3.1 | 8.4 | 21 |
| 2 | 480 | 0 | 0.9 | 7.5 |
| 3 | 300 | 0.2 | 3.0 | ./. |

We claim:

1. A process for the preparation of homopolymers and copolymers of C$_{2-6}$-α-monoolefins wherein said monoolefins are polymerized at from 20° to 160° C. and under a pressure of from 1 to 100 bar, by means of a Ziegler-Natta catalyst system comprising (1) a titanium-III component, in the preparation of which (1.1) a titanium-containing compound (a) of the formula TiCl$_3$.nAlCl$_3$ where n is a number from 0.1 to 0.4 and (1.2) a phosphorus-containing compound (b) of the formula O$_m$PR$_3^1$ where m is 0 or 1, R$^1$ is R$^2$, OR$^2$ or NR$_2^2$ and R$^2$ is alkyl, aryl, alkaryl or aralkyl, of not more than 24 carbon atoms, are subjected to a milling treatment wherein (A) a vibratory ball mill which has a milling acceleration of from 45 to 55 m.sec$^{-2}$ is employed, (B) the mill is first charged with the titanium-containing compound (a) and then (C) while milling the charge at from $-30°$ to $+60°$ C., the amount of the phosphorus-containing compound (b) which corresponds to a molar ratio of titanium in the titanium-containing compound (a): phosphorus-containing compound (b) of from 1:0.1 to 1:0.35 is added continuously or in small portions at a rate of from 1 to 80 ml/min per 2.5 kg of titanium-containing compound (a), in the absence of a diluent, thereupon (D) the charge is kept at from $+30°$ to $+90°$ C. for a period of from 5 to 30 hours, whilst being milled, hereupon (E) the product obtained from (D) is milled further for a period of from 2 to 30 minutes, at from $-40°$ C. to $0°$ C., in the absence of a diluent, then (F) the product obtained from (E) is kept at from $+45°$ to $+100°$ C. for a period of from 2 to 150 hours, without being milled, (2) an aluminium-alkyl component of the formula $$\begin{array}{c} R^3-Al-R^4 \\ | \\ Cl \end{array}$$

where R$^3$ and R$^4$ are identical or different and each is alkyl of 1 to 8 carbon atoms,
with the proviso that the atomic ratio of titanium from the titanium-III component (1): aluminum from the aluminum-alkyl component (2) is from 1:1 to 1:20, in which process a titanium-III component (1) is employed, in the preparation of which, additionally, (H) a suspension is prepared from (H$_1$) 1 part by weight of the product obtained from (F), (H$_2$) from 0.7 to 2 parts by weight of a hydrocarbon (c) which is liquid at standard temperature and pressure and boils below 100° C. and (H$_3$) an oxygen-containing compound (d) consisting of an ester which has a total of 2 to 34 carbon atoms and has the formula R$^9{}'$—O—CO—R$^9$   or

R$^9{}'$—O—CO—C=CH
                |    |
                R$^9$  R$^9$ where R$^9$ is (I) hydrogen, (II) alkyl of 1 to 12 carbon atoms, (III) phenylalkyl of a total of 7 to 14 carbon atoms, in which 1 hydrogen atom of the phenyl radical can be replaced by alkyl, (IV) phenyl or (V) alkylphenyl of a total of 7 to 14 carbon atoms, and R$^9{}'$ is (I) alkyl of 1 to 8 carbon atoms, (II) phenyl or (III) phenylalkyl of a total of 7 to 14 carbon atoms, in such amount that the molar ratio of titanium from the titanium-containing compound (a): oxygen-containing compound (d) is from 1:0.08 to 1:0.5, thereafter (I) the suspension obtained from (H) is kept at from $+50°$ to $+95°$ C. for from 15 to 60 minutes, with vigorous agitation, and is then brought to from $+15°$ to $+25°$ C., and hereupon (J) the solid is isolated from the suspension obtained according to (I), washed with a hydrocarbon which is liquid at standard temperature and pressure and boils below 100° C. and dried, the solid thus obtained in isolated form from (J) constituting the novel titanium-III component (1).

2. The process of claim 1, wherein the Ziegler-Natta catalyst system contains as an additional component (3) a phenolic compound of the formula

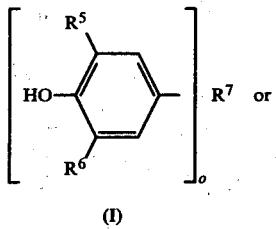

(I)

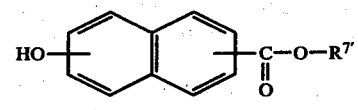

(II)

where R$^5$ is C$_1$-C$_6$-alkyl, R$^6$ is hydrogen or C$_1$-C$_6$-alkyl, R$^7$ is hydrogen or a saturated hydrocarbon radical of not more than 30 carbon atoms, which may or may not contain up to a total of 6 ether groups and/or ester groups, R$^{7'}$ is C$_2$-C$_{24}$-alkyl, and o is an integer from 1 to 6,
with the proviso that the molar ratio of aluminum-alkyl component (2): phenolic compound (3) is from 3:1 to 25:1.

3. A process for the preparation of homopolymers of propylene wherein said homopolymers are polymerized at from 20° to 160° C. and under a pressure of from 1 to 100 bar, by means of a Ziegler-Natta catalyst system comprising (1) a titanium-III component, in the preparation of which (1.1) a titanium-containing compound (a) of the formula TiCl$_3$.0.33AlCl$_3$ and (1.2) tri-n-butylphosphine as a phosphorus-containing compound (b) are subjected to a milling treatment wherein (A) a vibratory ball mill which has a milling acceleration of from 45 to 55 m.sec$^{-2}$ is employed, (B) the mill is first charged with the titanium-containing compound (a) and then (C) while milling the charge at from −30° to +60° C., the amount of the phosphorus-containing compound (b) which corresponds to a molar ratio of titanium in the titanium-containing compound (a): phosphorus-containing compound (b) of from 1:0.1 to 1:0.35 is added continuously or in small portions at a rate of from 1 to 80 ml/min per 2.5 kg of titanium-containing compound (a), in the absence of a diluent, thereupon (D) the charge is kept at from +° to +90° C. for a period of from 5 to 30 hours, while being milled, hereupon (E) the product obtained from (D) is milled further for a period of from 2 to 30 minutes, at from −40° to 0° C., in the absence of a diluent, then (F) the product obtained from (E) is kept at from +45° to +100° C. for a period of from 2 to 150 hours, without being milled, (2) diethyl-aluminum chloride as an aluminium-alkyl component with the proviso that the atomic ratio of titanium from the titanium-III component (1): aluminum from the aluminum-alkyl component (2) is from 1:1 to 1:20, in which process a titanium-III component (1) is employed, in the preparation of which, additionally, (H) a suspension is prepared from (H$_1$) 1 part by weight of the product obtained from (F), (H$_2$) from 0.7 to 2 parts by weight of a hydrocarbon (c) which is liquid at standard temperature and pressure and boils below 100° C. and (H$_3$) an oxygen-containing compound (d) consisting of ethyl caproate in such amount that the molar ratio of titanium from the titanium-containing compound (a): oxygen-containing compound (d) is from 1:0.8 to 1:0.5, thereafter (I) the suspension obtained from (H) is kept at from +50° to +95° C. for from 15 to 60 minutes, with vigorous agitation, and is then brought to from +15° to +25° C., and hereupon (J) the solid is isolated from the suspension obtained according to (I), washed with a hydrocarbon which is liquid at standard temperature and pressure and boils below 100° C. and dried, the solid thus obtained in isolated form from (J) constituting the novel titanium-III component (1).

4. The process of claim 3, wherein the Ziegler-Natta catalyst system contains as an additional component (3) n-octadecyl-$\beta$-(4'-hydroxy-3',5'-di-tert.-butyl-phenyl)-propionate as a phenolic compound, with the proviso that the molar ratio of aluminum-alkyl component (2): phenolic compound (3) is from 3:1 to 25:1.

* * * * *